United States Patent Office 3,300,518
Patented Jan. 24, 1967

3,300,518
17α-TRIFLUOROVINYL ANDROSTENES
John Fried, Plainfield, Thomas S. Bry, Linden, and Arthur A. Patchett, Metuchen, N.J., assignors to Merck & Co., Inc., Rahway, N.J., a corporation of New Jersey
No Drawing. Filed Oct. 4, 1961, Ser. No. 142,776
9 Claims. (Cl. 260—397.4)

This invention is concerned generally with novel steroid compounds and processes for preparing the same. More particularly, it relates to novel 17α-trifluorovinyl-19-nor-testosterone, and the Δ⁵⁽¹⁰⁾-isomers thereof, starting with 3 - methoxy - 2,5(10)-androstadiene - 17 - one, and to closely related compounds.

The compounds prepared by our invention are valuable as orally and parenterally active progestational agents.

In preparing our novel chemical compounds, the starting material utilized is the 3-methoxy-2,5(10)-androstadiene-17-one, which has the following structural formula:

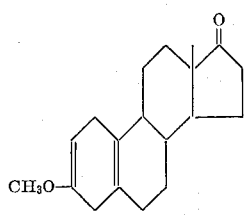

It has been found that the above starting material will react with trifluorovinyl magnesium bromide to form the 17α - trifluorovinyl - 3 - methoxy - 2,5(10) - androstadiene-17β-ol which has the following structural formula:

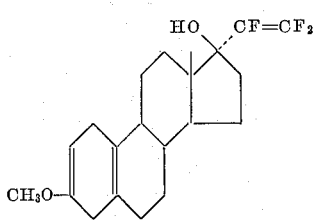

The 17α - trifluorovinyl - 3 - methoxy - 2,5(10) - androstadiene-17β-ol is converted into the 17α-trifluorovinyl-17β-hydroxy-19-nor-4-androstene-3-one which has the following formula:

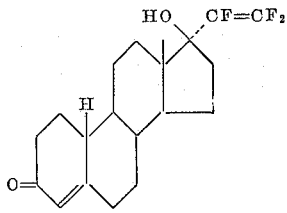

by reaction with a strong mineral acid, such as p-toluenesulfonic acid. For example, a mixture of the steroid and p-toluenesulfonic acid in acetone solution is left standing at room temperature for about 18 hours.

The 17α - trifluorovinyl - 17β - hydroxy - 19 - nor - 4-androstene-3-one is converted into the 17β-alkanoyl ester by reaction with an alkanoic acid anhydride or alkanoyl halide in the presence of antertiary amine such as pyridine. The acid anhydrides which may be used for this purpose include acetic anhydride, propionic anhydride, butyric anhydride and the like. The 17β-caproate is prepared by the reaction of the 21β-free alcohol with caproyl halide in the presence of a tertiary amine base.

The 3-enol ethers of the 17α-trifluorovinyl-17β-hydroxy-19-nor-4-androstene-3-one, i.e. the 3-alkoxy-17α-trifluorovinyl-19-nor-3,5-androstadiene-17β-ols, which have the following formula:

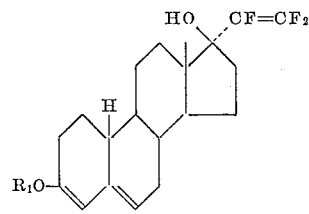

wherein $R_1$ stands for an alkyl group, are prepared by stirring together a mixture of the steroid and an alkyl orthoformate in dioxane solution in the presence of a strong acid catalyst such as mineral acid, or an organic sulfonic acid. In the reaction, the 17β-alkoxy- or the 17β-alkanoyloxy derivative may be used in place of the 17β-hydroxy-compound to obtain the corresponding 17β-alkoxy- or 17β-alkanoyloxy derivatives.

In a preferred embodiment of our invention, the novel 3-enol cyclopentyl ether of the 17α-trifluorovinyl-17β-hydroxy-19-nor-4-androstene-3-one is prepared by adding cyclopentyl orthoformate and p-toluenesulfonic acid to a solution of the steroid in cyclopentanol and stirring together at room temperature. The acid catalyst is then neutralized with a base such as pyridine. The 3-enol n-butyl ether of the 17α-trifluorovinyl-17β-hydroxy-19-nor-4-androstene-3-one is prepared by stirring together a mixture of the steroid and n-butyl orthoformate and 2,4-dinitrobenzenesulfonic acid in dioxane solution overnight at about 30° C. The acid catalyst is then neutralized with a base such as pyridine.

The 17α - trifluorovinyl - 3 - methoxy - 2,5(10) - androstadiene-17β-ol is converted into the 17α-trifluorovinyl-17β-hydroxy-5(10)-androstene-3-one which has the following formula:

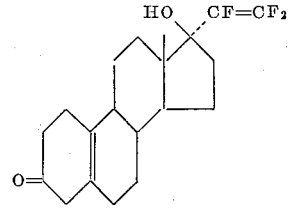

by reaction with a weak organic acid such as acetic acid. For example, a mixture of the steroid and glacial acetic acid and sodium acetate in an aqueous solution of absolute ethanol and tetrahydrofuran is left standing at room temperature for several hours.

The 17α - trifluorovinyl - 17β - hydroxy - 4,9 - androstadiene-3-one which has the following formula:

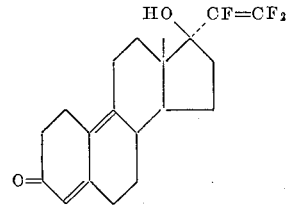

is prepared by the reaction of 17α-trifluorovinyl-17β-hydroxy-5(10)-androstene-3-one, with approximately one equivalent of bromine in pyridine solution, or with pyridine perbromide hydrobromide.

The 17α - trifluorovinyl - 17β - hydroxy - 4,9 - androstadiene-3-one is converted into the 17β-alkanoyl ester by reaction with an alkanoic acid anhydride or alkanoyl halide in the presence of a tertiary amine such as pyridine.

The following examples illustrate methods of carrying out the present invention but it is to be understood that these examples are given for purposes of illustration and not of limitation.

*Example 1*

A 500 cc. three-neck round bottom flask is fitted with a Dry Ice condenser, a dropping funnel and a magnetic stirrer. After the addition of 4.0 g. of magnesium, the entire system is swept with nitrogen and flame dried. One hundred cc. of dry tetrahydrofuran is added to the magnesium and 13 g. of trifluorovinyl bromide is bubbled into the solution held at 25° C. with stirring. The solution is decanted into a dry flask and stored. A solution of 500 mg. of 3-methoxy-2,5(10)-androstadiene-17-one which is dried by azeotropic distillation from benzene, is added in 5 cc. of benzene and 5 cc. of dry ether to 50 cc. of the trifluorovinyl magnesium bromide solution prepared above. The reaction is stirred for 16 hours at room temperature. Water is then added and the mixture extracted with ether. The organic extracts are washed with water until the washings are weakly basic, dried over sodium sulfate and concentrated in vacuo. The residue is chromatographed on 20 g. of basic alumina, by charging with petroleum ether and eluting with a mixture of petroleum ether and ether to give 17α-trifluorovinyl-3-methoxy-2,5(10)-androstadiene-17β-ol.

*Example 2*

To 150 mg. of the product obtained in Example 1, in 15 cc. of acetone is added 15 mg. of paratoluenesulfonic acid. This mixture is allowed to stand for 18 hours at room temperature, and is then poured into ice water and extracted with ether. The organic extracts are washed to neutrality with water, dried over sodium sulfate and concentrated in vacuo. The residue is chromatographed on 5 g. of acid-washed alumina by charging with benzene and eluting with 6 parts of a mixture of petroleum ether with 4 parts of ether. Recrystallization from a mixture of petroleum ether and ether affords 17α-trifluorovinyl-17β-hydroxy-19-nor-4-androstene-3-one.

*Example 3*

One hundred mg. of 17α-trifluorovinyl-17β-hydroxy-19-nor-4-androstene-3-one is heated with 1 cc. of acetic anhydride and 1.2 cc. of pyridine on the steam bath overnight. The reaction mixture is then poured onto ice and extracted with chloroform. The extract is washed with water and concentrated. The concentrate is chromatographed over acid-washed alumina and eluted with mixtures of ether and petroleum ether to give 17β-acetoxy-17α-trifluorovinyl-19-nor-4-androstene-3-one.

*Example 4*

One hundred mg. of 17α-trifluorovinyl-17β-hydroxy-19-nor-4-androstene-3-one is heated with 1 cc. of caproyl chloride and 1.2 cc. of pyridine on the steam bath overnight. The reaction mixture is then poured onto ice and extracted with chloroform. The extract is washed with water and concentrated. The concentrate is chromatographed over acid-washed alumina and eluted with mixtures of ether and petroleum ether to give 17β-caproyloxy-17α-trifluorovinyl-19-nor-4-androstene-3-one.

*Example 5*

To a solution of 100 mg. of 17a-trifluorovinyl-17β-hydroxy-19-nor-4-androstene-3-one in 3 cc. of cyclopentanol is added 1 cc. of cyclopentyl orthoformate and 10 mg. of p-toluenesulfonic acid. The reaction mixture is stirred at room temperature for 3 hours and 1 cc. of pyridine is added, followed by the dropwise addition of 5 cc. of water. The aqueous phase is separated and extracted with benzene. The organic extracts are washed with a sodium bicarbonate solution and then with water until the washings are neutral. The organic phase is dried over sodium sulfate and concentrated in vacuo to give 3-cyclopentyloxy-17α-trifluorovinyl-19-nor-3,5-androstadiene-17β-ol.

In accordance with the above procedures, but starting with the 17β-acetoxy-17α-trifluorovinyl-19-nor-4-androstene-3-one in place of the 17α-trifluorovinyl-17β-hydroxy-19-nor-4-androstene-3-one there is obtained as products the corresponding 17β-acetoxy-3-cyclopentyloxy-17α-trifluorovinyl-19-nor-3,5-androstadiene.

*Example 6*

A mixture of 100 mg. of 17α-trifluorovinyl-17β-hydroxy-19-nor-4-androstene-3-one, 0.06 g. 2,4-dinitrobenzenesulfonic acid, 3 ml. of dry dioxane and 0.25 ml. of freshly-distilled n-butyl orthoformate are stirred over night at 30° C. The acid catalyst is then neutralized by addition of 0.1 ml. of pyridine. The reaction mixture is diluted with water and extracted with ether. The combined ether extracts are washed with water, dried and evaporated under reduced pressure. The residue is chromatographed over alumina (alkaline) and eluted with mixtures of ether and petroleum ether to separate substantially pure 3-n-butoxy-17α-trifluorovinyl-19-nor-3,5-androstadiene-17β-ol.

In accordance with the above procedures, but starting with the 17β-acetoxy-17α-trifluorovinyl-19-nor-4-androstene-3-one in place of the 17α-trifluorovinyl-17β-hydroxy-19-nor-4-androstene-3-one there is obtained the corresponding 17β-acetoxy-3-n-butoxy-17α-trifluorovinyl-19-nor-3,5-androstadiene.

*Example 7*

To 410 mg. of 17α-trifluorovinyl-3-methoxy-2,5(10)-androstadiene-17β-ol in 4.1 cc. of tetrahydrofuran and 18.45 cc. of absolute ethanol is added 8.2 cc. of glacial acetic acid and 0.5 g. of sodium acetate in 4.1 cc. of water. This reaction mixture is left stirring at room temperature for 5 hours. It is then poured into an ice-sodium bicarbonate solution and extracted with benzene. The benzene extract is washed with water until the washings are just slightly basic, dried over sodium sulfate and concentrated in vacuo. The crude product is chromatographed on 40 g. of silica gel by charging with a mixture of 1 part benzene and 1 part petroleum ether, and eluting with mixtures of petroleum ether and ether to yield 17α-trifluorovinyl-17β-hydroxy-19-nor-5(10)-androstene-3-one.

*Example 8*

To 100 mg. of 17α-trifluorovinyl-17β-hydroxy-5(10)-androstene-3-one in 5 cc. of pyridine is added one equivalent of bromine. The reaction is stirred for 24 hours at room temperature, poured into ice-water and extracted with ether. The ether extract is washed with water, dried over sodium sulfate, and concentrated in vacuo to yield 17α-trifluorovinyl-17β-hydroxy-19-nor - 4,9 - androstadiene-3-one.

*Example 9*

One-hundred mg. of 17α-trifluorovinyl-17β-hydroxy-19-nor-4,9-androstadiene-3-one is heated with 1 cc. of acetic anhydride and 1.2 cc. of pyridine on the steam bath overnight. The reaction mixture is then poured onto ice and extracted with chloroform. The extract is washed with water and concentrated. The concentrate is chromatographed over acid-washed alumina and eluted with mixtures of ether and petroleum ether to give 17β-acetoxy-17α-trifluorovinyl-19-nor-4,9-androstadiene-3-one.

Various changes and modifications may be made in carrying out the present invention without departing from the spirit and scope thereof. Insofar as these changes and modifications are within the purview of the annexed claims, they are to be considered as part of our invention.

We claim:

1. A compound selected from the group consisting of 3-lower alkoxy 17α-trifluorovinyl-19-nor-3,5-androstadiene-17β-ol and the 17β-alkanoyl esters thereof.

2. 3-cyclopentyloxy - 17α - trifluorovinyl-19-nor-3,5-androstadiene-17β-ol.

3. 3-butoxy-17α - trifluorovinyl - 19-nor-3,5-androstadiene-17β-ol.

4. 3-cyclopentyloxy - 17β - acetoxy-17α-trifluorovinyl-19-nor-3,5-androstadiene.

5. A compound selected from the group consisting of 17α-trifluorovinyl - 17β - hydroxy-19-nor-4,9-androstadiene-3-one and the 17β-alkanoyl esters thereof.

6. Process for the preparation of 17α-trifluorovinyl-17β-hydroxy-19-nor-4-androstene-3-one which comprises reacting 17α-trifluorovinyl-3-methoxy-2,5(10)-androstadiene-17β-ol with an organic sulfonic acid.

7. Process for the preparation of 17α-trifluorovinyl-17β-hydroxy-19-nor-5(10)-androstene-3-one which comprises reacting 17α - trifluorovinyl-3-methoxy - 2,5(10)-androstadiene-17β-ol with a weak acid.

8. Process for the preparation of 17α-trifluorovinyl-17β-hydroxy-19-nor - 4,9(10)-androstadiene-3-one which comprises reacting 17α-trifluorovinyl-17β-hydroxy-19-nor-5(10)-androstene-3-one with pyridinium bromide hydrobromide in pyridine.

9. Process for the preparation of 17α-trifluorovinyl-17β-hydroxy-19-nor-4,9-androstadiene-3-one which comprises reacting 17α - trifluorovinyl - 17β-hydroxy-5(10)-androstene - 3 - one with approximately one equivalent weight of bromine in pyridine solution.

References Cited by the Examiner

Fieser and Fieser, "Steroids," 1959 (Reinhold Publishing Co., New York), pp. 468 and 514.

LEWIS GOTTS, *Primary Examiner.*

MORRIS LIEBMAN, *Examiner.*

E. L. ROBERTS, M. L. WILLIAMS,
*Assistant Examiners.*